(12) United States Patent
Anderson

(10) Patent No.: US 10,372,650 B2
(45) Date of Patent: Aug. 6, 2019

(54) CROSS-OVER AND BYPASS CONFIGURATIONS FOR HIGH-SPEED DATA TRANSMISSION

(71) Applicant: Apple Inc., Cupertino, CA (US)

(72) Inventor: Eric W. Anderson, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 223 days.

(21) Appl. No.: 14/629,358

(22) Filed: Feb. 23, 2015

(65) Prior Publication Data

US 2015/0212966 A1 Jul. 30, 2015

Related U.S. Application Data

(62) Division of application No. 13/403,182, filed on Feb. 23, 2012, now Pat. No. 8,966,134.
(Continued)

(51) Int. Cl.
*G06F 13/00* (2006.01)
*G06F 13/40* (2006.01)
(Continued)

(52) U.S. Cl.
CPC ........ *G06F 13/4027* (2013.01); *G06F 13/385* (2013.01); *G06F 13/4022* (2013.01); *G06F 13/4221* (2013.01)

(58) Field of Classification Search
None
See application file for complete search history.

(56) References Cited

U.S. PATENT DOCUMENTS 3,581,143 A 5/1971 Dornfeld
4,628,151 A 12/1986 Cardas
(Continued)

FOREIGN PATENT DOCUMENTS

CN 1168549 A 12/1997
CN 1351356 A 5/2002
(Continued)

OTHER PUBLICATIONS

Non-Final Office Action for U.S. Appl. No. 13/480,345, dated Apr. 1, 2013, 6 pages.
(Continued)

*Primary Examiner* — Henry Tsai
*Assistant Examiner* — Dean Phan
(74) *Attorney, Agent, or Firm* — Kilpatrick Townsend & Stockton, LLP

(57) ABSTRACT

Circuits, methods, and apparatus that may improve networking techniques for transferring data among various electronic devices. One example may provide sharing data among various devices by daisy-chaining devices together. That is, several devices may be connected to each other through a series of cables to form a chain of devices. In this physical configuration, data may be shared among multiple devices using a series of single-hop virtual tunnels. Alternatively, a number of tunnels may be formed by a host device, each having a target device in the daisy chain. Each tunnel may originate at the host device and terminate at their target device. Each tunnel may bypass devices between the host device and the tunnel's target device. These two techniques may also be combined. Another example may provide a method of simplifying the routing of high-speed data signals through a network topology.

19 Claims, 6 Drawing Sheets

Related U.S. Application Data

(60) Provisional application No. 61/446,027, filed on Feb. 23, 2011.

(51) Int. Cl.
  *G06F 13/38* (2006.01)
  *G06F 13/42* (2006.01)

(56) References Cited

U.S. PATENT DOCUMENTS

| | | | |
|---|---|---|---|
| 5,228,035 A | 7/1993 | Hirato et al. | |
| 5,313,465 A | 5/1994 | Perlman et al. | |
| 5,711,686 A | 1/1998 | O'Sullivan et al. | |
| 6,029,137 A | 2/2000 | Cordery et al. | |
| 6,169,251 B1 | 1/2001 | Grant et al. | |
| 6,485,335 B1 | 11/2002 | Dewdney | |
| 6,495,763 B1 | 12/2002 | Eichmann et al. | |
| 6,653,813 B2 | 11/2003 | Khatri | |
| 6,677,534 B2 | 1/2004 | Yamamoto et al. | |
| 6,792,474 B1 | 9/2004 | Hopprich et al. | |
| 6,798,790 B1 | 9/2004 | Enssle et al. | |
| 6,998,538 B1 | 2/2006 | Fetterolf, Sr. et al. | |
| 7,033,219 B2 | 4/2006 | Gordon et al. | |
| 7,174,413 B2 | 2/2007 | Pettey et al. | |
| 7,188,209 B2 | 3/2007 | Pettey et al. | |
| 7,197,549 B1 | 3/2007 | Salama et al. | |
| 7,219,183 B2 | 5/2007 | Pettey et al. | |
| 7,255,602 B1 | 8/2007 | Driessen et al. | |
| 7,323,640 B2 | 1/2008 | Takahashi et al. | |
| 7,366,182 B2 | 4/2008 | O'Neill | |
| 7,369,388 B2 | 5/2008 | Cheung et al. | |
| 7,422,471 B1 | 9/2008 | Wu | |
| 7,447,922 B1 | 11/2008 | Asbury et al. | |
| 7,466,712 B2 | 12/2008 | Makishima et al. | |
| 7,480,303 B1 | 1/2009 | Ngai | |
| 7,561,855 B2 | 7/2009 | Hofmeister et al. | |
| 7,562,176 B2 | 7/2009 | Kloeppner et al. | |
| 7,587,575 B2 | 9/2009 | Moertl et al. | |
| 7,689,755 B2 | 3/2010 | Balasubramanian et al. | |
| 7,743,197 B2 | 6/2010 | Chavan et al. | |
| 7,830,882 B2 | 11/2010 | Johnson | |
| 7,860,205 B1 | 12/2010 | Aweya et al. | |
| 7,944,200 B2 | 5/2011 | Endo et al. | |
| 8,267,718 B2 | 9/2012 | Straka et al. | |
| 8,312,302 B2 | 11/2012 | Baker et al. | |
| 8,327,536 B2 | 12/2012 | Kim et al. | |
| 8,380,912 B2* | 2/2013 | Jaramillo | 710/313 |
| 8,463,881 B1 | 6/2013 | Baker et al. | |
| 8,516,238 B2 | 8/2013 | Cornelius et al. | |
| 8,683,190 B2 | 3/2014 | Cornelius et al. | |
| 8,696,378 B2 | 4/2014 | Behziz et al. | |
| 8,801,461 B2 | 8/2014 | Kim et al. | |
| 8,862,912 B2 | 10/2014 | Baker et al. | |
| 8,966,134 B2 | 2/2015 | Anderson | |
| 8,976,799 B1 | 3/2015 | Baker et al. | |
| 2002/0010799 A1 | 1/2002 | Kubota et al. | |
| 2002/0093935 A1 | 7/2002 | Denney et al. | |
| 2003/0030720 A1 | 2/2003 | Hutchings | |
| 2003/0137997 A1 | 7/2003 | Keating | |
| 2004/0023645 A1 | 2/2004 | Olsen et al. | |
| 2004/0080544 A1 | 4/2004 | Stripling | |
| 2004/0115988 A1 | 6/2004 | Wu | |
| 2004/0196682 A1 | 10/2004 | Funaba et al. | |
| 2005/0025119 A1 | 2/2005 | Pettey et al. | |
| 2005/0044236 A1 | 2/2005 | Stafford | |
| 2005/0060470 A1 | 3/2005 | Main et al. | |
| 2005/0060480 A1 | 3/2005 | Solomon | |
| 2005/0111362 A1 | 5/2005 | Freytsis et al. | |
| 2005/0147119 A1 | 7/2005 | Tofano | |
| 2005/0182876 A1 | 8/2005 | Kim et al. | |
| 2005/0238035 A1 | 10/2005 | Riley | |
| 2005/0262269 A1 | 11/2005 | Pike | |
| 2005/0281193 A1 | 12/2005 | Hofmeister et al. | |
| 2006/0023386 A1 | 2/2006 | Palinkas et al. | |
| 2006/0029038 A1 | 2/2006 | Jungck | |
| 2006/0083518 A1 | 4/2006 | Lee et al. | |
| 2006/0092928 A1 | 5/2006 | Pike et al. | |
| 2006/0168387 A1 | 7/2006 | Gan et al. | |
| 2006/0200600 A1 | 9/2006 | Groso | |
| 2006/0206655 A1 | 9/2006 | Chappell et al. | |
| 2006/0288098 A1 | 12/2006 | Singh et al. | |
| 2007/0011536 A1 | 1/2007 | Khanna et al. | |
| 2007/0025481 A1 | 2/2007 | Ryu et al. | |
| 2007/0067654 A1 | 3/2007 | Adachi | |
| 2007/0074891 A1 | 4/2007 | Burke | |
| 2007/0086487 A1 | 4/2007 | Yasuda et al. | |
| 2007/0111597 A1 | 5/2007 | Kondou et al. | |
| 2007/0174733 A1* | 7/2007 | Boyd et al. | 714/48 |
| 2007/0208899 A1 | 9/2007 | Freking et al. | |
| 2007/0266179 A1 | 11/2007 | Chavan et al. | |
| 2008/0065738 A1 | 3/2008 | Landers et al. | |
| 2008/0079462 A1 | 4/2008 | Chiu et al. | |
| 2008/0091857 A1 | 4/2008 | McDaniel | |
| 2008/0117909 A1 | 5/2008 | Johnson | |
| 2008/0123672 A1 | 5/2008 | Wilkinson | |
| 2008/0147898 A1 | 6/2008 | Freimuth et al. | |
| 2008/0172501 A1 | 7/2008 | Goodart et al. | |
| 2008/0195747 A1 | 8/2008 | Elmaliah | |
| 2008/0222338 A1 | 9/2008 | Balasubramanian | |
| 2008/0250175 A1 | 10/2008 | Sheafor | |
| 2008/0256445 A1 | 10/2008 | Olch et al. | |
| 2008/0266730 A1 | 10/2008 | Viborg et al. | |
| 2008/0279186 A1 | 11/2008 | Winter et al. | |
| 2008/0318348 A1 | 12/2008 | Grupen-Shemansky | |
| 2009/0003335 A1 | 1/2009 | Biran et al. | |
| 2009/0003361 A1 | 1/2009 | Bakthavathsalam | |
| 2009/0006710 A1 | 1/2009 | Daniel et al. | |
| 2009/0016348 A1 | 1/2009 | Norden et al. | |
| 2009/0022176 A1 | 1/2009 | Nguyen | |
| 2009/0037606 A1 | 2/2009 | Diab | |
| 2009/0063701 A1 | 3/2009 | Bagepalli et al. | |
| 2009/0070775 A1 | 3/2009 | Riley | |
| 2009/0117754 A1* | 5/2009 | Fields et al. | 439/55 |
| 2009/0182917 A1* | 7/2009 | Kim | 710/106 |
| 2009/0222924 A1 | 9/2009 | Droz et al. | |
| 2009/0279473 A1 | 11/2009 | Lu et al. | |
| 2009/0301755 A1 | 12/2009 | Shintani | |
| 2010/0014598 A1 | 1/2010 | Pfeifer | |
| 2010/0046590 A1 | 2/2010 | Harper et al. | |
| 2010/0085091 A1 | 4/2010 | Strazzieri et al. | |
| 2010/0185792 A1 | 7/2010 | Yao et al. | |
| 2010/0303442 A1 | 12/2010 | Newton et al. | |
| 2011/0019383 A1 | 1/2011 | Aoyama et al. | |
| 2011/0167187 A1 | 7/2011 | Crumlin et al. | |
| 2011/0256756 A1 | 10/2011 | Lu et al. | |
| 2011/0278043 A1 | 11/2011 | Ueda et al. | |
| 2012/0005394 A1* | 1/2012 | Goodart et al. | 710/313 |
| 2012/0103651 A1 | 5/2012 | Kim | |
| 2012/0104543 A1 | 5/2012 | Shahoian | |
| 2012/0106018 A1 | 5/2012 | Shahoian et al. | |
| 2012/0152613 A1 | 6/2012 | Kim et al. | |
| 2012/0182223 A1 | 7/2012 | Zeng et al. | |
| 2012/0226774 A1 | 9/2012 | Hochsprung | |
| 2014/0220822 A1 | 8/2014 | Keyser et al. | |
| 2014/0344615 A1 | 11/2014 | Cornelius et al. | |
| 2014/0359319 A1 | 12/2014 | Baker et al. | |

FOREIGN PATENT DOCUMENTS

| | | |
|---|---|---|
| CN | 101010833 A | 8/2007 |
| CN | 101248559 A | 8/2008 |
| CN | 201215850 Y | 4/2009 |
| CN | 201285827 Y | 8/2009 |
| CN | 101803121 A | 8/2010 |
| CN | 202678638 U | 1/2013 |
| CN | 202797544 U | 3/2013 |
| EP | 1202419 A1 | 5/2002 |
| EP | 2090955 A1 | 8/2009 |
| JP | 57-064083 U | 4/1982 |
| JP | H05-41255 A | 2/1993 |
| JP | H08-265600 | 10/1996 |
| JP | H11-273790 A | 10/1999 |
| JP | 2000-077141 A | 3/2000 |
| JP | 2001-109697 A | 4/2001 |

(56) References Cited

FOREIGN PATENT DOCUMENTS

| JP | 2003-189263 A | 7/2003 |
|---|---|---|
| JP | 2004-095518 A | 3/2004 |
| JP | 2004-126885 A | 4/2004 |
| JP | 2004-193090 A | 7/2004 |
| JP | 2005-521368 A | 7/2005 |
| JP | 2005-243446 A | 9/2005 |
| JP | 2005-309744 A | 11/2005 |
| JP | 2006-048594 A | 2/2006 |
| JP | 2007-086876 A | 4/2007 |
| JP | 2007-251779 A | 9/2007 |
| JP | 2007-535235 A | 11/2007 |
| JP | 2008-252310 A | 10/2008 |
| JP | 2009-076375 A | 4/2009 |
| JP | 2009-123561 A | 6/2009 |
| KR | 20090079879 A | 7/2009 |
| TW | 200303126 A | 8/2003 |
| TW | 589563 B | 6/2004 |
| TW | I239127 B | 9/2005 |
| TW | 200627322 A | 8/2006 |
| TW | 200838085 A | 9/2008 |
| TW | 200909825 A | 3/2009 |
| WO | 2006/102606 A2 | 9/2006 |
| WO | 2006/102606 A3 | 9/2006 |
| WO | 2007/099507 A2 | 9/2007 |
| WO | 2009/039287 A2 | 3/2009 |
| WO | 2009/039287 A3 | 3/2009 |
| WO | 2009/046617 A1 | 4/2009 |
| WO | 2009/0866566 A1 | 7/2009 |
| WO | 2010/051281 A2 | 5/2010 |
| WO | 2010/051281 A3 | 5/2010 |
| WO | 2012/003347 A1 | 1/2012 |
| WO | 2012/003381 A2 | 1/2012 |
| WO | 2012/003385 A1 | 1/2012 |

OTHER PUBLICATIONS

Notice of Allowance for U.S. Appl. No. 12/239,743, dated Feb. 19, 2013, 18 pages.
Notice of Allowance for U.S. Appl. No. 13/173,739, dated May 13, 2013, 11 pages.
Notice of Allowance for U.S. Appl. No. 13/173,979, dated Jul. 11, 2012, 5 pages.
Non-Final Office Action for U.S. Appl. No. 13/615,642, dated Apr. 12, 2013, 8 pages.
Display Port, Wikipedia, the free encyclopedia, 4 pages; printed on Aug. 29, 2008 from http://en.wikipedia.org/wiki/Displayport; page states it was last modified on Aug. 25, 2008.
Dopplinger, A., et al. "Using IEEE 1588 for synchronization of network-connected devices", Mar. 29, 2007, from www.embedded.com/columns/technicalinsights/, 7 pages.
Ethernet, Wikipedia, the free encyclopedia, 9 pages; printed on Aug. 17, 2008 from http://en.wikipedia.org/wiki/Ethernet; page states it was last modified on Aug. 17, 2008.
Final Office Action for U.S. Appl. No. 12/239,742, dated Oct. 15, 2010, 14 pages.
Final Office Action for U.S. Appl. No. 12/239,743, dated Nov. 12, 2010, 15 pages.
IDT 24-Lane 3-Port PCI Express, 89HPES24N3 Data Sheet, Jul. 18, 2006, 30 pages.
IEEE 1394 interface, Wikipedia, the free encyclopedia, 7 pages; printed on Jul. 24, 2008 from http://en.wikipedia.org/wiki/Firewire; page states it was last modified on Jul. 23, 2008.
International Preliminary Report on Patentability for PCT Application No. PCT/US2011/042684, dated Jan. 17, 2013, 12 pages.
International Preliminary Report on Patentability for PCT Application No. PCT/US2011/042634, dated Jan. 17, 2013, 13 pages.
International Preliminary Report on Patentability for PCT Application No. PCT/US2011/042689, dated Jan. 17, 2013, 7 pages.
International Search Report and Written Opinion, dated Jan. 31, 2012 for PCT Patent Application No. PCT/US2011/042684, 18 pages.
International Search Report and Written Opinion, dated Nov. 30, 2011 for PCT Patent Application No. PCT/US2011/042634, 20 pages.
International Search Report and Written Opinion, dated Sep. 28, 2011 for PCT Patent Application No. PCT/US2011/042689, 10 pages.
Non-Final Office Action for U.S. Appl. No. 12/239,742, dated Apr. 28, 2010, 14 pages.
Non-Final Office Action for U.S. Appl. No. 12/239,742, dated Dec. 7, 2012, 10 pages.
Non-Final Office Action for U.S. Appl. No. 12/239,743 dated Jun. 21, 2012, 15 pages.
Non-Final Office Action for U.S. Appl. No. 12/239,743, dated May 25, 2010, 10 pages.
Non-Final Office Action for U.S. Appl. No. 13/173,979, dated Mar. 15, 2012, 8 pages.
Notice of Allowance for U.S. Appl. No. 13/033,562, dated Aug. 8, 2012, 6 pages.
Office Action for European Patent Application No. 11743164.3, dated Mar. 5, 2013, 2 pages.
Office Action for Japanese Patent Application No. 2012-543350, dated Nov. 19, 2012, in 4 pages.
PCI Express Architecture, Chapter 3, Address Spaces & Transaction Routing, from PCIEX.book, pp. 105-152, Aug. 5, 2003.
PCI Express Base Specification Revision 1.0a, Apr. 15, 2003, pp. 1-426.
PCI Express, Wikipedia, the free encyclopedia, 11 pages; printed on Jul. 24, 2008 from http://en.wikipedia.org/wiki/PCI-Express; page states it was last modified on Jul. 16, 2008.
PCI-X, Wikipedia, the free encyclopedia, 4 pages; printed on Sep. 9, 2008, from http://en.wikipedia.org/wiki/PCI-X; page states it was last modified on Sep. 4, 2008.
Peer-to-peer, Wikipedia, the free encyclopedia, 11 pages; printed on Jul. 24, 2008, from http://en.wikipedia.org/wiki/Peer-to-peer; page states it was last modified on Jul. 24, 2008.
Peripheral Component Interconnect, Wikipedia, the free encyclopedia, 7 pages; printed on Jul. 24, 2008, from http://en.wikipedia.org/wiki/PCI_%28bus%29; page states it was last modified on Jul. 23, 2008.
Universal Serial Bus, Wikipedia, the free encyclopedia, 17 pages; printed on Jul. 24, 2008, from http://en.wikipedia.org/wiki/USB; page states it was last modified on Jul. 23, 2008.
VESA DisplayPort Standard, Version 1, Revision 1a, Jan. 11, 2008, 238 pages.
Notice of Allowance for Japanese Patent Application No. 2012-543350, dated Mar. 12, 2013, in 3 pages.
Office Action for Japanese Patent Application No. 2012-541240, dated Oct. 26, 2012, 3 pages.
Notice of Allowance for Japanese Patent Application No. 2012-541240, dated Apr. 30, 2013, 3 pages.
Office Action for Chinese Patent Application No. 201120235164.4, dated May 4, 2012, with English translation, 2 pages.
Notice of Allowance for Chinese Patent Application No. 201120235164.4, dated Sep. 17, 2012, with English translation, 4 pages.
Notice of Allowance for Chinese Patent Application No. 201120235144.7, dated Mar. 1, 2012, with English Translation, 4 pages.
Final Office Action dated Jul. 8, 2013 for U.S. Appl. No. 12/239,742, 14 pages.
Non-Final Office Action dated Jul. 9, 2013 for U.S. Appl. No. 13/033,542, 16 pages.
Non-Final Office Action dated Jul. 9, 2013 for U.S. Appl. No. 13/033,553, 17 pages.
Office Action for Chinese Patent Application No. 201110189140.4, dated Aug. 19, 2013, 11 pages.
Japanese Notice of Allowance dated Aug. 5, 2013 for JP Patent Application No. 2012-547345, 3 pages.
Non-Final Office Action dated Sep. 9, 2013 for U.S. Appl. No. 13/249,260, 21 pages.
Chinese Office Action dated Sep. 18, 2013 for CN Patent Application No. 201110189137.2, with English Translation, 14 pages.
Chinese Office Action dated Sep. 24, 2013 for CN Patent Application No. 201110189138.7, with English Translation, 10 pages.

(56) References Cited

OTHER PUBLICATIONS

Non-Final Office Action dated Oct. 3, 2013 for U.S. Appl. No. 13/403,209, 18 pages.
Salvator, Dave; "Business Wire on Intel Announces Thunderbolt Technology,"; Feb. 24, 2013, 3 pages.
Pang, Tiffany; TI Introduces High-Performance, Dual-Mode DisplayPort Switches and DHMI/DVI Level Translations; Connects new PC Video Standard to Monitors and TVs,; Mar. 11, 2008, 3 pages.
Texas Instruments; "DisplayPort Switch,"; Feb. 2008, 25 pages.
Texas Instruments; "DisplayPort Switch,"; Jan. 2008, revised Mar. 2008, 56 pages.
Final Office Action for U.S. Appl. No. 13/615,642, dated Oct. 23, 2013, 11 pages.
Notice of Allowance for U.S. Appl. No. 13/480,345, dated Oct. 30, 2013, 7 pages.
Office Action for Korean Patent Application No. 10-2012-7032488, dated Oct. 31, 2013, with English translation, 6 pages.
Non-Final Office Action for U.S. Appl. No. 12/239,742, dated Nov. 22, 2013, 11 pages.
Non-Final Office Action for U.S. Appl. No. 13/403,182, dated Dec. 20, 2013, 14 pages.
Office Action for Taiwanese Patent Application No. 100123236, dated Feb. 19, 2014, with English translation, 4 pages.
Office Action for Taiwanese Patent Application No. 100123233, dated Feb. 19, 2014, with English translation, 7 pages.
Office Action for Taiwanese Patent Application No. 100123170, dated Feb. 20, 2014, with English translation, 6 pages.
Office Action for Korean Patent Application No. 10-2012-7032475, dated Feb. 25, 2014, with English translation, 6 pages.
Final Office Action for U.S. Appl. No. 13/033,553, dated Mar. 10, 2014, 16 pages.
Office Action for Chinese Patent Application No. 201110189140.4, dated Mar. 28, 2014, 3 pages.
Office Action for Korean Patent Application No. 10-2012-7032848, dated Apr. 30, 2014, with English translation, 5 pages.
Notice of Allowance for U.S. Appl. No. 13/615,642, dated Apr. 30, 2014, 5 pages.
Final Office Action dated May 23, 2014 for U.S. Appl. No. 13/403,209, 28 pages.
Chinese Office Action dated May 26, 2014 for CN Patent Application No. 201110189137.2, with English Translation, 10 pages.
Final Office Action for U.S. Appl. No. 13/403,182, dated Jun. 11, 2014, 13 pages.
Chinese Office Action dated Jun. 12, 2014 for CN Patent Application No. 201110189138.7, with English Translation, 7 pages.
Final Office Action for U.S. Appl. No. 12/239,742, dated Jul. 8, 2014, 19 pages.
Office Action for EP Application No. 11743164.3, dated Aug. 1, 2014, 6 pages.
Final Office Action dated Oct. 16, 2014 for U.S. Appl. No. 13/033,542, 20 pages.
Notice of Allowance dated Oct. 17, 2014, for U.S. Appl. No. 13/403,182, 7 pages.
Non-Final Office Action dated Nov. 5, 2014 for U.S. Appl. No. 14/218,877, 4 pages.
Notice of Allowance dated Jan. 13, 2015 for U.S. Appl. No. 12/239,742, 12 pages.
Non-Final Office Action dated Mar. 16, 2015 for U.S. Appl. No. 13/403,209, 35 pages.
Taiwan Office Action dated Mar. 23, 2015 for TW Patent Application No. 100123170, with English translation, 9 pages.
Notice of Allowance dated Apr. 13, 2015 for U.S. Appl. No. 13/033,542, 15 pages.
Japanese Office Action dated Jul. 27, 2015 for JP Patent Application No. 2013-110372, with English summary, 6 pages.
Non-Final Office Action dated Aug. 13, 2015 for U.S. Appl. No. 14/448,862, 10 pages.
Final Office Action dated Jun. 3, 2015 for U.S. Appl. No. 14/218,877, 7 pages.
Final Office Action dated Nov. 3, 2015 for U.S. Appl. No. 13/403,209, 35 pages.
Notice of Allowance dated Oct. 22, 2015 for U.S. Appl. No. 14/218,877, 10 pages.
Taiwan Office Action dated Dec. 2, 2015 for TW Patent Application No. 100123170, with English translation, 3 pages.
Notice of Allowance dated Mar. 1, 2016, for U.S. Appl. No. 13/404,949, 9 pages.
Final Office Action dated Mar. 31, 2016, for U.S. Appl. No. 14/448,862, 7 pages.

\* cited by examiner

CROSS-OVER AND BYPASS CONFIGURATIONS FOR HIGH-SPEED DATA TRANSMISSION

CROSS-REFERENCES TO RELATED APPLICATIONS

This application is a divisional of U.S. patent application Ser. No. 13/403,182, filed Feb. 23, 2012, which claims the benefit of U.S. provisional patent application No. 61/446,027, filed Feb. 23, 2011, which are hereby incorporated by reference.

BACKGROUND

Computing environments are becoming increasingly complex. One reason is that computing tasks are becoming more complicated. Another is that extremely high-quality, specialized computing devices are becoming popular.

These ever increasingly complicated tasks have driven a recent evolutionary change to many people's computer systems, specifically, the inclusion of multiple display screens. For example, an electronic engineer may use one display to show a schematic of a portion of an electronic device and another display to show a layout of that portion of the electronic device. Also, these complicated tasks have led to increases in the amount of data that needs to be stored. In particular, video applications may be capable of generating huge amounts of data. In response, external hard drives have become a popular way to store this data.

The availability of specialized devices has also acted to increase many user's computing environments. For example, laptop computers have become so powerful that for many, they are not only a portable computing device, but have taken over duties as a desktop computer as well. But often times, perhaps at work or at home, users may want a bigger screen than a laptop may provide. In such a case, a larger, external display may be used. Also, a laptop may have a limited storage capacity. This, and a desire to perform backup tasks, may prompt a user to add an external storage drive.

To share data, these devices need to connect to each other, either through cables, wirelessly, or by using other means. When connecting these devices through these cables, it may be useful to be able to optimally utilize the bandwidth available at these connections.

Thus, what is needed are circuits, methods, and apparatus that may improve networking techniques for transferring data among various electronic devices.

SUMMARY

Accordingly, embodiments of the present invention may provide circuits, methods, and apparatus that may improve networking techniques for transferring data among various electronic devices.

An illustrative embodiment of the present invention may provide sharing data among various devices by daisy-chaining devices together. That is, several devices may be connected to each other through a series of cables to form a chain of devices. For example, a host device, such as a laptop, may connect to an external display through a first cable, while an external storage drive may connect to the display through a second cable. Data on these cables may be received by, and transmitted by, router chips or other appropriate devices. This configuration allows the host device, the laptop, to display graphics images on the display and to store data in the external drive.

With this physical connection, data may be shared among these devices in a number of ways. That is, various virtual connections may be configured given a set physical connection. Each virtual connection from one device to another may be referred to as a hop. A tunnel may be used to convey data from one device to one or more other devices, which may be referred to as destination devices. A tunnel may be one hop in length, or it may be multiple hops in length. A device where a tunnel terminates may be referred to as a target device.

In a specific embodiment of the present invention, data may be shared among multiple devices using a series of single-hop tunnels. This technique may provide for potentially very long daisy chains of devices at the cost of an increase in latency through the chain.

In another specific embodiment of the present invention, a number of tunnels may be formed by a host device. These tunnels may each have a target device in the daisy chain. Some of these tunnels may be multiple hops in length. Each tunnel may originate at the host device and terminate at their target device. Each tunnel may bypass devices, if any, between the host device and the tunnel's target device. This technique may reduce latency, but the length of a resulting daisy chain may be limited by the number of tunnels that may be formed by the host. In various embodiments of the present invention, the number of tunnels that may be formed by a host device may be limited by a number of available hardware resources. For example, a number of adapters for a particular protocol in the host device may limit the number of tunnels that may be formed.

In another specific embodiment of the present invention, these two techniques may be combined. For example, a number of tunnels may be formed by a host device, where each tunnel carries data for multiple destination devices. Each tunnel may originate in the host device and terminate in a target device. Each tunnel may bypass intermediate devices between the host device and their target device. A series of single-hop tunnels may then convey data from the target device to the tunnel's other destination devices.

Another illustrative embodiment of the present invention may provide a method of simplifying the routing of high-speed data signals through a network topology. In one example, a device may include two router devices. These router devices may be cross-coupled to connectors that may be connected to other electronic devices further down the daisy chain. By cross coupling these connectors, it does not matter which connector a downstream device connects to, the same data may appear on the same connector pins. Also, by cross-coupling these connectors, data may pass through a device having two router devices without that data having to be passed from one of the router devices to the other.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
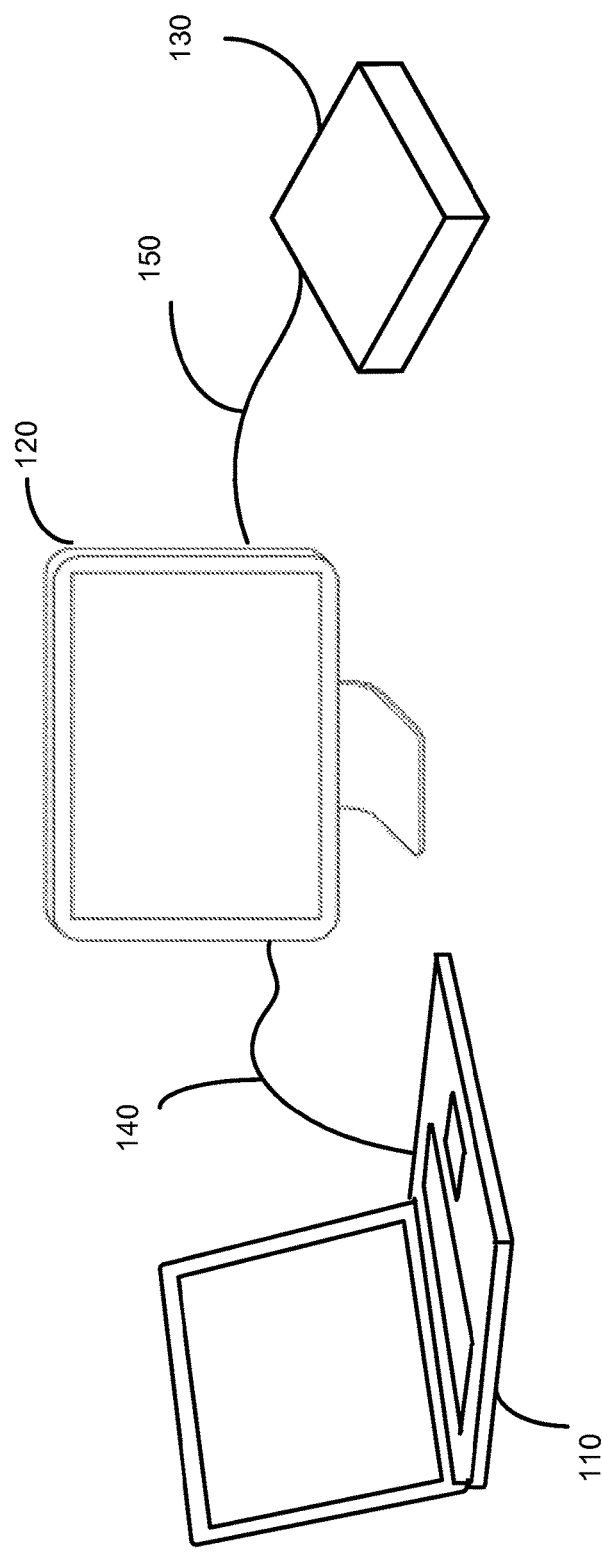
FIG. 1 illustrates a computer system that may be improved by the incorporation of embodiments of the present invention.

FIG. 1 illustrates a computer system that may be improved by the incorporation of embodiments of the present invention. This figure, as with the other included figures, is shown for illustrative purposes and does not limit either the possible embodiments of the present invention or the claims.

This figure includes host device 110, first electronic device 120, and second electronic device 130. In this example host device 110 is a laptop computer, while the first electronic device 120 and the second electronic device 130 are an external display and a hard drive. In other embodiments of the present invention, other types of devices may be connected together. Host device 110 may communicate with first electronic device 120 over cable 140. First electronic device 120 may communicate with second electronic device 130 over cable 150. In various embodiments of the present invention, cables 140 and 150 may be various types of cables. In a specific embodiment of the present invention, cables 140 and 150 may be Thunderbolt cables, though in other embodiments of the present invention, cables 140 and 150 may be DisplayPort cables, or other types of cables.

In various embodiments of the present invention, data may be transmitted and received over cables 140 and 150 using various types of circuitry. For example, router device or chips may be used to transmit and receive data over cables 140 and 150. A specific example of such a router device or chip may be the "Light Peak" developed at least in part by Intel Corp. of Santa Clara, Calif., though in other embodiments of the present invention, other types of router devices or chips may be used.

In a specific embodiment of the present invention, various types of data may be transmitted over cables 140 and 150. For example, DisplayPort or PCIe data may be transmitted using Thunderbolt packets over cables 140 and 150. In other embodiments of the present invention, other types of data formatted in other ways may be transmitted over cables 140 and 150.

In this example, cable 140 may carry data transmitted from host device 110 to first electronic device 120 and second electronic device 130. Cable 150 may carry data from first electronic device 120 to second electronic device 130. Similarly, cable 150 may carry data transmitted from second electronic device 130 to first electronic device 120. Cable 140 may carry data transmitted from first electronic device 120 to host device 110.

Once these physical connections are set, the virtual communication channels used to convey this data may be configured in various ways. For example, data may be transmitted over cables 140 and 150 using a series of one hop tunnels. This may provide an advantage in that very long daisy chained may be achieved. This long or large fanout, however, may come at the expense of increased latency. An example is shown in the following figure.

Figure 2:
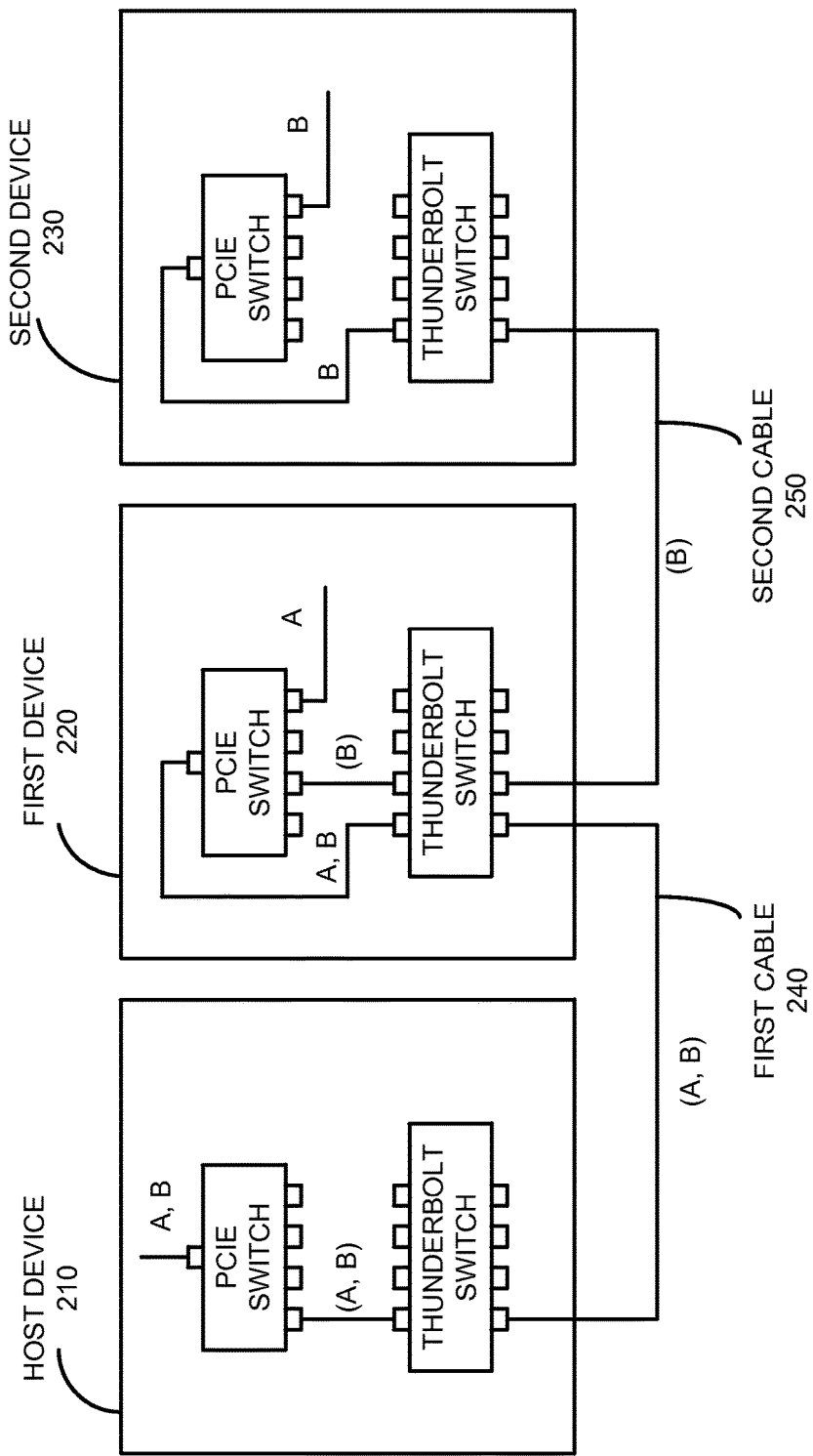
FIG. 2 illustrates a connection topology among router devices according to an embodiment of the present invention.

FIG. 2 illustrates a connection topology among router devices or chips (RCs) according to an embodiment of the present invention. In this example, each router chip may include a PCIe switch and a Thunderbolt switch. Each PCIe switch may have a number of adapters associated with it, which may form Thunderbolt tunnels for transmitting data. Each Thunderbolt switch may terminate a tunnel and provide PCIe data to its associated PCI switch. In various embodiments of the present invention, each Thunderbolt switch may also receive and transmit DisplayPort data, though these paths are left off these figures for clarity.

This figure illustrates a host device 210 connected to first device 220 over first cable 240, and second device 230 connected to first device 220 over second cable 250.

In this example, host device 210 may transmit data A to first device 220 and data B to second device 230. Accordingly, host device 210 may form a first tunnel (A,B) to carry data A to first device 220. The first tunnel (A,B) may be formed at a PCIe adapter associated with the PCIe switch in host device 210. The first tunnel (A,B) may terminate at a Thunderbolt switch in first device 220. Data A,B may be provided to its corresponding PCIe switch. The PCI switch may provide data A to circuitry coupled to the router chip in first device 220. An adapter associated with the PCIe switch may form a second tunnel (B). Second tunnel (B) may be conveyed using second cable 250 to second device 230. Data B may be provided through a corresponding PCIe switch to other circuitry in second device 230.

In a specific embodiment of the present invention, each Thunderbolt switch may be able to route data received from a first cable directly to a second cable. In this way, a data path may bypass a PCIe switch in a router device and avoid its attendant format changes. This may reduce the overall latency through a chain of devices. An example is shown in the following figure.

Figure 3:
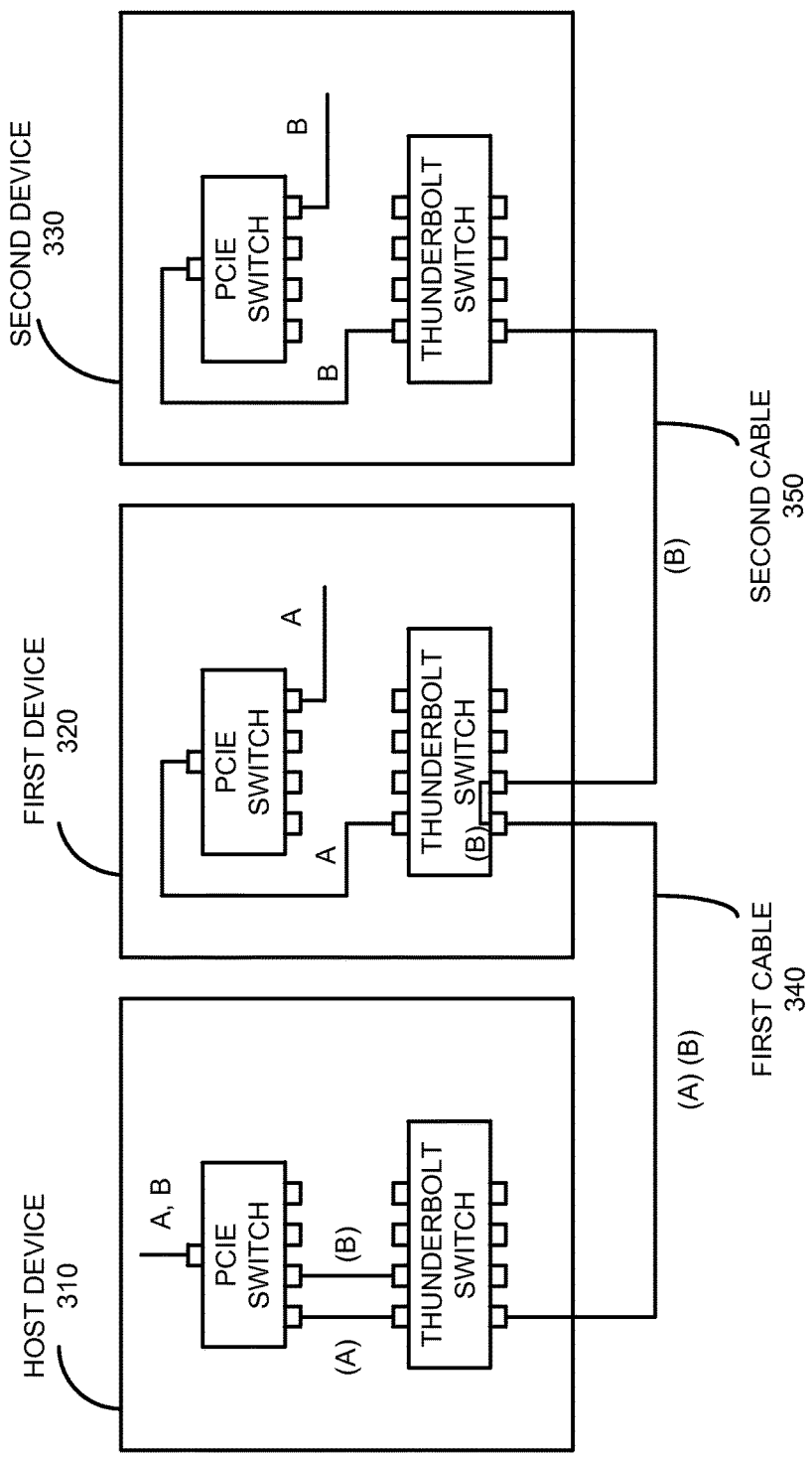
FIG. 3 illustrates a connection topology among routers according to an embodiment of the present invention.

FIG. 3 illustrates a connection topology among routers according to an embodiment of the present invention. In this example, host device 310 may communicate with first electronic device 320 through first cable 340, while second device 330 may communicate with first device 320 through second cable 350.

As before, host device 310 may transmit data A to first device 320, and data B to second device 330. Accordingly, data A and B may be received by the PCIe switch in host device 310. Adapters associated with this PCIe switch may form separate tunnels for data A and data B. These two tunnels may convey data using first cable 340 to first device 320. Tunnel (A) may terminate and data A may be provided by the PCIe switch to associated circuitry in first device 320. Tunnel (B) may bypass the PCIe switch and exit the Thunderbolt switch on second cable 350. In this configuration, tunnel (A) may be one hop long and tunnel (B) may be two hops long. Tunnel (B) may terminate at the Thunderbolt switch in second device 330, and data B may be provided by the associated PCIe switch to circuitry in second device 330.

In this way, the latency of data B may be reduced by bypassing the PCIe switch in first device 320. However, the number of tunnels may be limited by hardware resources in host device 310. For example, if a number of PCIe adapters that can tunnel PCIe data is limited to four, the maximum fanout from host device 310 is also four. Accordingly, embodiments of the present invention may provide a mix of the above to techniques. In this way, latency may be reduced, while maintaining long or large fanouts. An example is shown in the following figure.

Figure 4:
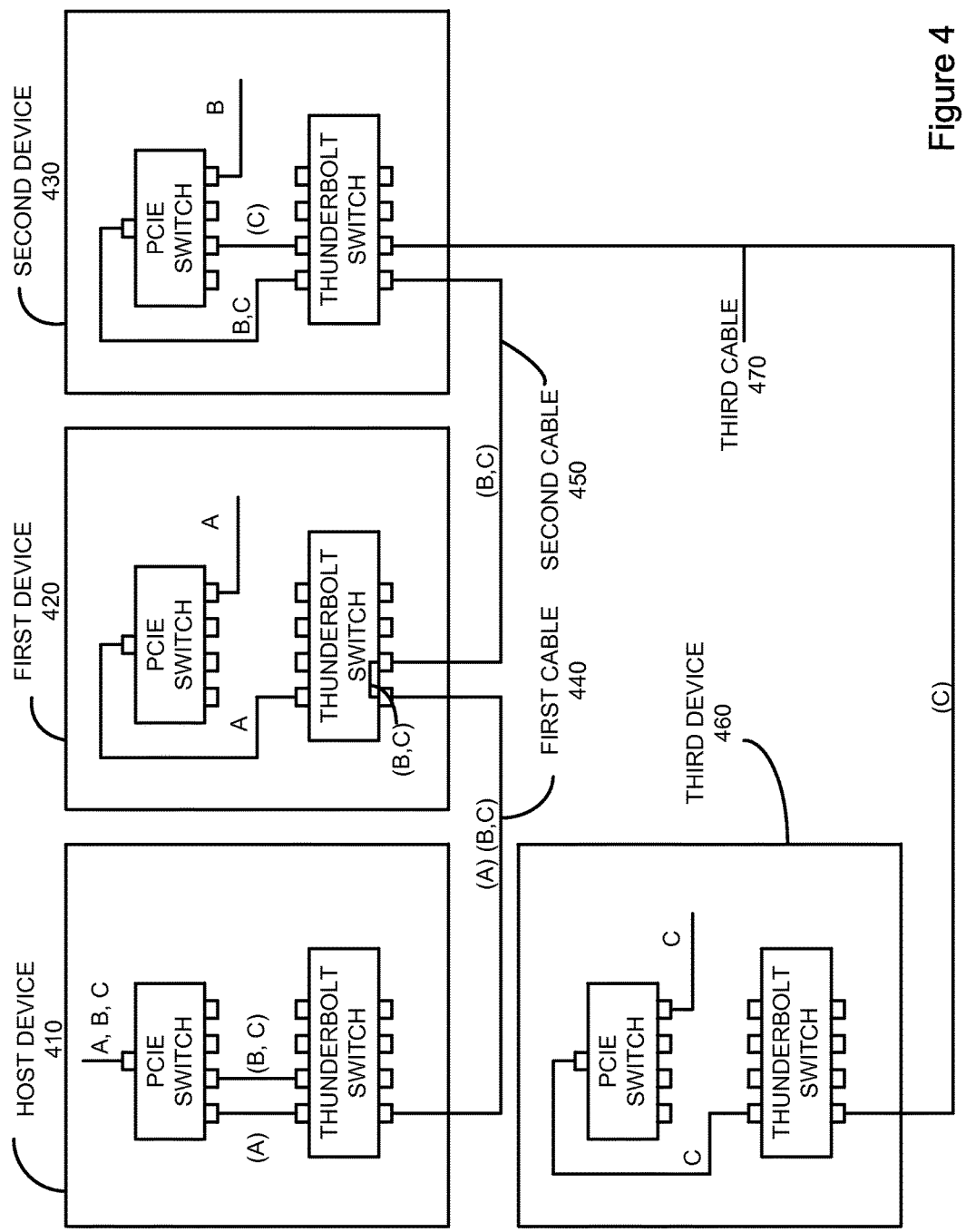
FIG. 4 illustrates a connection topology among router devices according to an embodiment of the present invention.

FIG. 4 illustrates a connection topology among router devices according to an embodiment of the present invention. In this example, host device 410 may communicate with first electronic device 420 through first cable 440, second device 430 may communicate with first device 420 through second cable 450, while third device 460 may communicate with second device 430 through third cable 470.

In this example, host 410 may transmit data A to first device 420, data B to second device 430, and data C to third device 460. A first adapter in host device 410 may form a first tunnel for data A, and a second adapter may form a second tunnel for data B and C. Tunnels (A) and (B,C) may be conveyed using first cable 440. Tunnel (A) may terminate in first device 420 and data A may be provided through its PCIe switch to associated circuitry.

Tunnel (B,C) may bypass the PCIe switch in first device 420 and exit the Thunderbolt switch on second cable 450. This may allow data B and C to avoid the latency incurred with the PCIe switch in first device 420. Tunnel (B,C) may terminate in second device 430. In this way, tunnel (B,C) may be two hops long. Data B may be provided by the PCIe switch in second device 430 to circuitry in second device 430. Tunnel (C) may be formed and provided on third cable 470, where it may be received by third device 460. The PCIe switch in third device 460 may provide this data to associated circuitry.

Again, in this example, data B and C may avoid the latency of a PCIE switch. Also, only the resources of two adapters in host device 410 are used transmit data to these three external devices. This tradeoff may help reduce latency while providing good fanout.

Devices consistent with various embodiments of the present invention may utilize multiple router devices. For example, some electronic devices may include two router chips or devices, though other devices may include more than two router chips or devices. When two or more devices are included, a first router device may be used to receive and provide data for the electronic device housing the routers, while a second router device may be used to send data to other electronic devices coupled downstream. To facilitate this, connector receptacles connected to the router devices may be cross coupled. This arrangement may allow multiple, high-bandwidth signal paths to use separate lanes, which may avoid bandwidth limitations that may otherwise result from sharing a single lane. An example is shown in the following figure.

Figure 5:
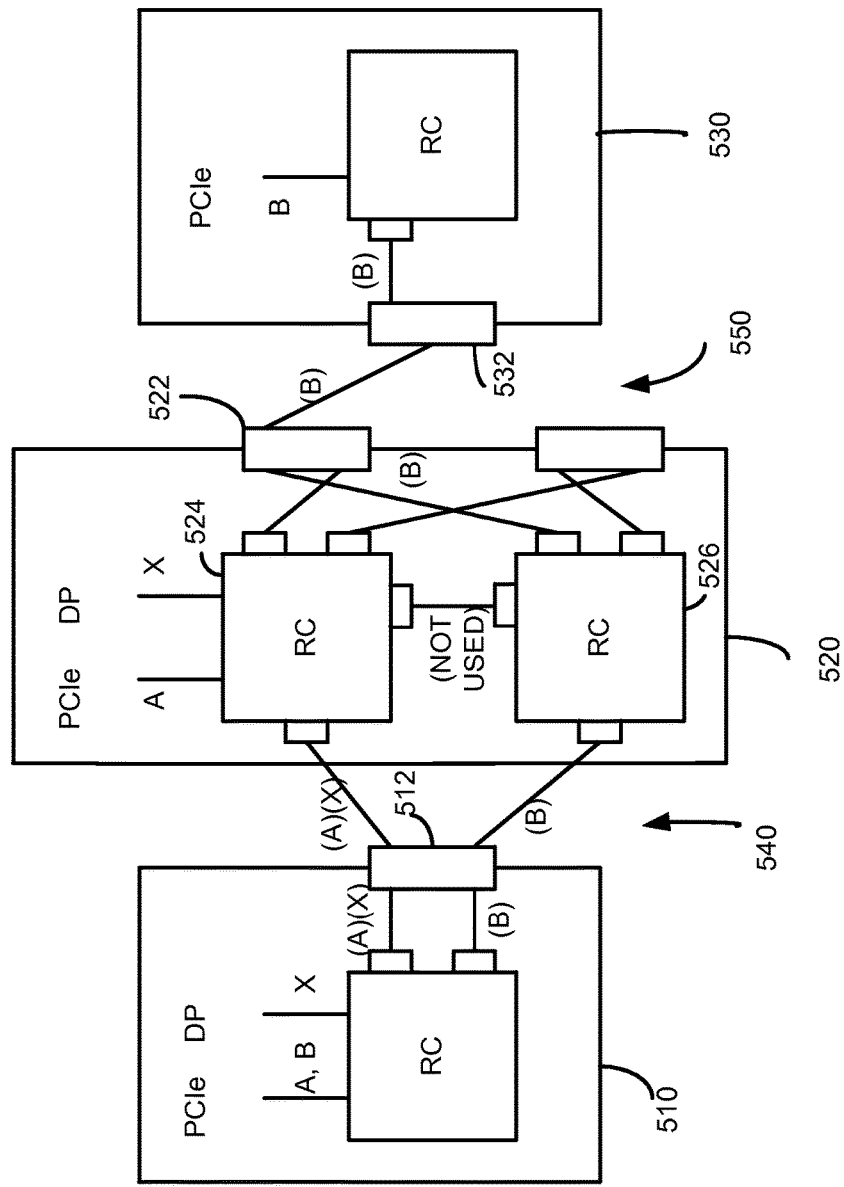
FIG. 5 illustrates a network topology where an electronic device includes two router devices according to an embodiment of the present invention.

FIG. 5 illustrates a network topology where an electronic device includes two router devices according to an embodiment of the present invention. This figure includes host device 510, first electronic device 520, and second electronic device 530. First electronic device 520 may be connected to host device 510 through a single tethered cable 540. That is, tethered cable may be dedicated to first electronic device 520 in that conductors in cable 540 attach to circuitry or other components inside first electronic device 520, as opposed to connecting to first electronic device 520 through a connector in an enclosure of first electronic device 520. Second electronic device 530 may be connected to first electronic device 520 through cable 550. In this example, the first electronic device 520 may be a display device.

Again, in this example, host device 510 may be connected to first electronic device 520 through tethered cable 540. This tethered cable may carry two lanes of data. A first lane of data may carry data A and X from connector 512 to a first router chip or device 524 in first electronic device 520, while a second lane may carry data B from connector 512 to second router chip or device 526 in first electronic device 520. Physically, these lanes may be specific wires in tethered cable 540. They may terminate at one end at specific pins or contacts in connector 512. In practical applications, connector 512 may be a composite of a connector insert attached to an end of tethered cable 540 and a connector receptacle in host device 510. The lanes may be assigned to specific pins or contacts in the connectors.

Again, in this example, host 510 may transmit PCIe data A and DisplayPort data X to first electronic device 520, and PCIe data B to second electronic device 530. Accordingly, host device 510 may provide data A and X to a first lane defined by pins of connector 512 and data B to a second lane of connector 512. First router chip 524 may provide PCIe data A and DisplayPort data X to associated circuitry in first electronic device 520. (It should be noted that in these examples, associated circuitry is connected to the top router device or chip, such as router device 524, and is not directly connected to the lower router device or chip, such as router chip 526.) Second router chip or device 526 may provide data B to connector 522. Second electronic device 530 may receive data B through cable 550 and connector 532. In this example, data B may pass through electronic device 520. That is, data B may not need to be passed from router device 524 to router device 526. This may help reduce the latency of data B and saves power. It should also be noted that it does not matter which connector of second electronic device 530 that cable 550 is connected to. If cable 550 is connected to the lower connector receptacle, routing device 526 could be configured to deliver data B to that connector.

This arrangement may also be useful in load-balancing where two DisplayPort or other high-bandwidth signals are received by an electronic device, since each signal may be assigned to a separate lane and each routing device may handle one of these high-bandwidth signals. An example is shown in the following figure.

Figure 6:
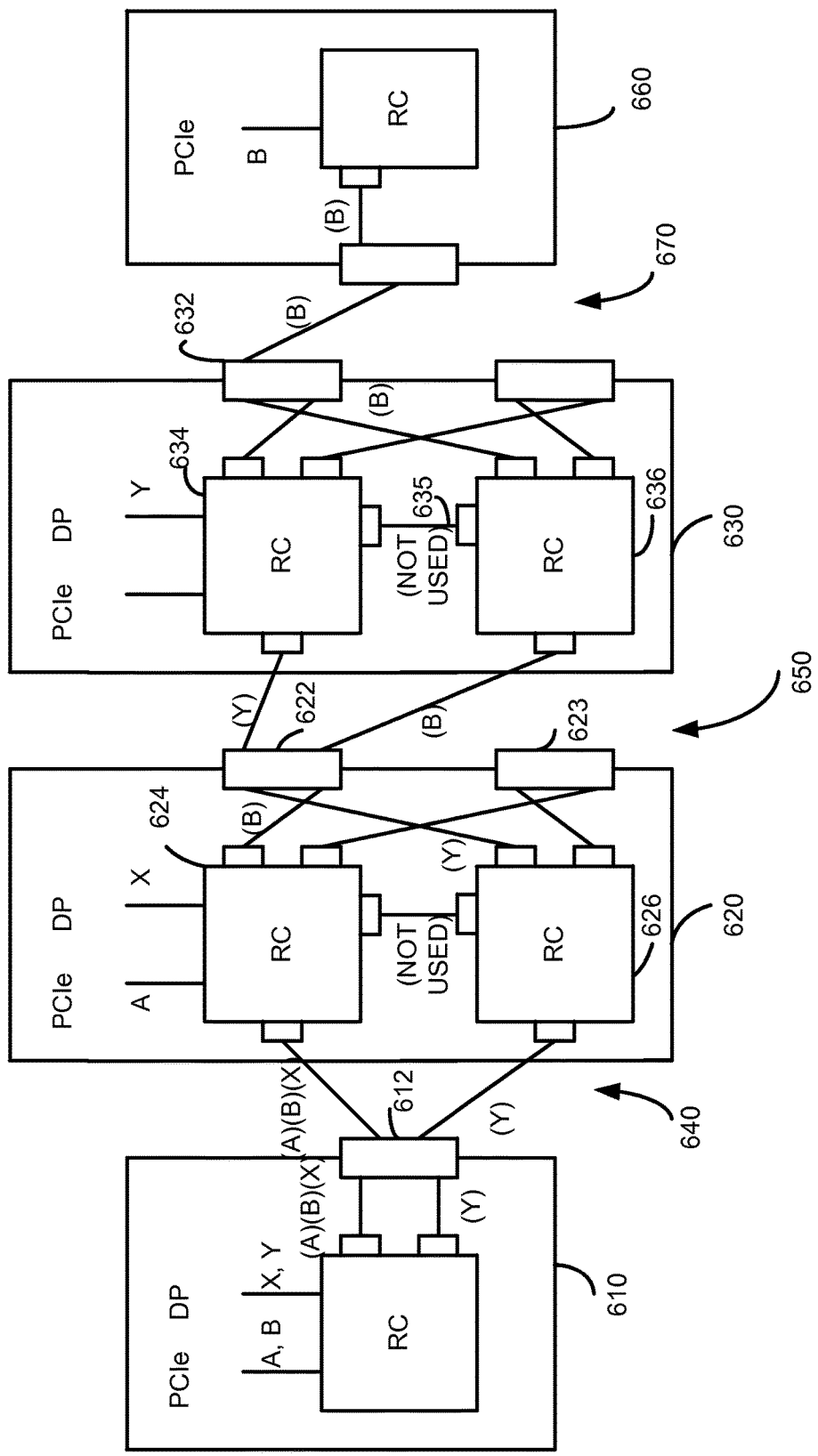
FIG. 6 illustrates another network topology where a device includes two router devices according to an embodiment of the present invention.

FIG. 6 illustrates another network topology where a device includes two router devices according to an embodiment of the present invention. This figure includes host device 610, first electronic device 620, third electronic device 630, and fourth electronic device 660. As before, first electronic device 620 may couple to host device 610 through tethered cable 640. Second electronic device 630 may couple to first electronic device 620 through tethered cable 650. Third electronic device 660 may couple to second electronic device 630 through cable 670. In this example, first electronic device 620 and second electronic device 630 may be display devices.

In this example, host device 610 may transmit PCIe data A and DisplayPort data X to first electronic device 620, DisplayPort data Y to second electronic device 630, and PCIe data B to third electronic device 660. Accordingly, host device 610 may provide data A, B, and X to a first lane on connector 612, and data Y on a second lane of connector 612. First routing device 624 in first electronic device 620 may provide PCIe data A and DisplayPort data X to internal circuitry. First routing device 624 may further provide data B to a second lane of connector 622. Second routing device 626 may provide data Y to a first lane on connector 622.

Second electronic device 630 may receive data Y and provides it to internal circuitry. Second routing chip 636 may provide data B to a first lane on connector 632. Third electronic device 660 may receive data B.

In this example, host device 610 may provide two high-speed data signals X and Y. In this configuration, these high-speed signals may use separate lanes and separate routing chips. Again, this may help reduce latency, and may also help balance the bandwidth load among the various circuits.

More specifically, in this example, data X and Y may be DisplayPort signals, though in other configurations, they may be other types of data. These signals may consume a great deal of bandwidth, so much so that in some embodiments of the present invention, data X and Y may not be able to share a data lane. That is, the bandwidth requirements of data X and Y may exceed the bandwidth capacity of a single lane. Accordingly, this configuration allows data X to share a lane with data A and B, which may be lower bandwidth signals, while providing a separate lane for data Y. By allowing data X to have its own lane separate from data Y, host device 610 may provide DisplayPort data to first electronic device 620 and second electronic device 630.

As can be seen in this example, the cross coupling router chip outputs at the connectors of first electronic device 620 and second electronic device 630 may allow the high-bandwidth data signals X and Y to be routed using separate lanes. For example, since data Y is not used by first electronic device 620, it may be provided by host device 610 on a second lane that is received over tethered cable 640 by routing chip 626. Routing device or chip 626 may then provide data Y on a first lane to either connector 622 or 623, depending on where cable 650 is inserted. By providing data Y on this first lane, data Y may be received by router chip or device 634 in second electronic device 630, which may provide it to associated circuitry, as shown.

It should be noted that without cross coupling, router chip 626 in first electronic device 620 may provide data Y on the second lane with data B, such that data Y would be received by routing device or chip 636. In this case, routing chip 636 would have to provide data Y over connection 635 to routing chip or device 634, which would then provide data Y to the associated circuitry. This extra jump over path 635 may add latency to data Y, consume extra power, and also slow the transmission of data B.

It should also be noted that the benefit of this configuration arises independently of the connector on the first electronic device that the tethered cable 650 is connected to. Specifically, if tethered cable 650 is connected to connector receptacle 623, then routing device 626 in first electronic device 620 may provide data Y to routing device 634 in second electronic device 630 via connector receptacle 623.

In various embodiments of the present invention, various connections may be made among routing chips or devices and connectors. In this example, a first input/output port on a first routing device may be connected to pins of a second lane on a first connector and a second input/output port on the first routing device may be connected to pins of a second lane on a second connector. Similarly, a first input/output port on a second routing device may be connected to pins of a first lane on a first connector and a second input/output port on the second routing device may be connected to pins of a first lane on a second connector.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of transferring data among a plurality of electronic devices, the method comprising:
   receiving first data at a first routing circuit of a first electronic device;
   receiving second data at a second routing circuit of the first electronic device;
   providing the first data using the first routing circuit to one of a first electronic circuit of the first electronic device, a second set of pins of a first connector of the first electronic device, or a second set of pins of a second connector of the first electronic device; and
   providing the second data using the second routing circuit to one of a first set of pins of the first connector of the first electronic device or a first set of pins of the second connector of the first electronic device,
   wherein the first connector and the second connector of the first electronic device are the same type of connector, each having corresponding pins in corresponding positions for a first lane and each having corresponding pins in corresponding positions for a second lane, the first set of pins of the first connector for a first lane of the first connector, the first set of pins of the second connector for a first lane of the second connector, the second set of pins of the first connector for a second lane of the first connector, and the second set of pins of the second connector for a second lane of the second connector, and
   wherein the first routing circuit of the first electronic device provides the first data to a second set of pins of a first connector of the first electronic device using an input/output port.

2. The method of claim 1 wherein the first data and second data include Thunderbolt data.

3. The method of claim 2 wherein the first electronic device is a display device.

4. The method of claim 3 wherein the first connector may connect to a hard drive.

5. The method of claim 1 wherein the first data and the second data are received by the first routing circuit and the second routing circuit using a first physical cable.

6. The method of claim 5 wherein the first physical cable is a tethered cable.

7. The method of claim 5 wherein the first data and the second data include PCIe data in a Thunderbolt tunnel.

8. An electronic device comprising:
   a first connector;
   a second connector, wherein the first connector and the second connector are the same type of connector, each having corresponding pins in corresponding positions for a first lane and each having corresponding pins in corresponding positions for a second lane;
   a first routing circuit coupled to receive data and having input/output circuitry coupled to pins for the second lane in the first connector and pins for the second lane in the second connector;
   a second routing circuit coupled to receive data and having input/output circuitry coupled to pins for the first lane in the first connector and pins for the first lane in the second connector; and
   a first electronic circuit coupled to the first routing circuit.

9. The electronic device of claim 8 wherein the first routing circuit is configured to receive first data and to provide the first data to one of the first electronic circuit, pins for the second lane in the first connector, or pins for the second lane in the second connector.

10. The electronic device of claim 9 wherein the second routing circuit is configured to receive second data and to provide the second data to one of the pins for the first lane in the first connector, or pins for the first lane in the second connector.

11. The electronic device of claim 10 wherein the first data and second data include Thunderbolt data.

12. The electronic device of claim 8 wherein the electronic device is a display device.

13. The electronic device of claim 12 wherein the first connector may connect to a hard drive.

14. The electronic device of claim 8 wherein the data is received by the first routing circuit and the second routing circuit using a first physical cable.

15. The electronic device of claim 14 wherein the first physical cable is a tethered cable.

16. The electronic device of claim 14 wherein the data includes PCIe data in a Thunderbolt tunnel.

17. The electronic device of claim 14 wherein data for the first routing circuit is conveyed in a first lane of the first physical cable and data for the second routing circuit is conveyed in a second lane of the first physical cable.

18. The electronic device of claim 17 wherein the first lane and the second lane of the first physical cable correspond to specific conductors in the first physical cable.

19. The electronic device of claim 8 wherein the first connector and the second connector are Thunderbolt connectors.

* * * * *